United States Patent
Jalal et al.

(10) Patent No.: US 12,079,132 B2
(45) Date of Patent: Sep. 3, 2024

(54) METHOD AND APPARATUS FOR EFFICIENT CHIP-TO-CHIP DATA TRANSFER

(71) Applicant: Arm Limited, Cambridge (GB)

(72) Inventors: Jamshed Jalal, Austin, TX (US); Ashok Kumar Tummala, Cedar Park, TX (US); Wenxuan Zhang, Austin, TX (US); Daniel Thomas Pinero, Austin, TX (US); Tushar P Ringe, Austin, TX (US)

(73) Assignee: Arm Limited, Cambridge (GB)

( * ) Notice: Subject to any disclaimer, the term of this patent is extended or adjusted under 35 U.S.C. 154(b) by 35 days.

(21) Appl. No.: 18/101,806

(22) Filed: Jan. 26, 2023

(65) Prior Publication Data

US 2024/0256460 A1   Aug. 1, 2024

(51) Int. Cl.
  *G06F 12/00* (2006.01)
  *G06F 12/0888* (2016.01)

(52) U.S. Cl.
  CPC .. *G06F 12/0888* (2013.01); *G06F 2212/1024* (2013.01)

(58) Field of Classification Search
  CPC ............. G06F 12/0888; G06F 12/0802; G06F 2212/1024; G06F 3/061; G06F 3/0683
  See application file for complete search history.

(56) References Cited

U.S. PATENT DOCUMENTS

2019/0342034 A1 * 11/2019 Mannava .............. H04L 67/568

OTHER PUBLICATIONS

An Introduction To CCIX® White Paper, https://www.ccixconsortium.com/wp-content/uploads/2019/11/CCIX-White-Paper-Rev111219.pdf, ccixconsortium.com was first indexed by Google in May 2016.
Kurt Lender, Compute Express Link™ (CXL™): A Coherent Interface for Ultra-High-Speed Transfers, © CXL™ Consortium 2020, Jul. 21, 2020.

* cited by examiner

*Primary Examiner* — Shawn X Gu
(74) *Attorney, Agent, or Firm* — Leveque Intellectual Property Law, P.C.

(57) ABSTRACT

Data transfer between caching domains of a data processing system is achieved by a local coherency node (LCN) of a first caching domain receiving a read request for data associated with a second caching domain, from a requesting node of the first caching domain. The LCN requests the data from the second caching domain via a transfer agent. In response to receiving a cache line containing the data from the second caching domain, the transfer agent sends the cache line to the requesting node, bypassing the LCN and, optionally, sends a read-receipt indicating the state of the cache line to the LCN. The LCN updates a coherency state for the cache line in response to receiving the read-receipt from the transfer agent and a completion acknowledgement from the requesting node. Optionally, the transfer agent may send the cache line via the LCN when congestion is detected in a response channel of the data processing system.

20 Claims, 8 Drawing Sheets

METHOD AND APPARATUS FOR EFFICIENT CHIP-TO-CHIP DATA TRANSFER

BACKGROUND

In a data processing system, data may be shared between processors and devices on one or more chips. A home node (HN) of the data processing system acts as a point-of-serialization (PoS) for transaction requests from local requesting agents and a point-of-coherency (PoC) for cache lines associated with a range of local memory addresses. However, accessing a cache line associated with a remote memory can result in increased latency and inefficient use of local resources when the cache line is passed between local and remote home nodes.

BRIEF DESCRIPTION OF THE DRAWINGS

The accompanying drawings provide visual representations which will be used to describe various representative embodiments more fully and can be used by those skilled in the art to better understand the representative embodiments disclosed and their inherent advantages. In these drawings, like reference numerals identify corresponding or analogous elements.

DETAILED DESCRIPTION

The various apparatus and devices described herein provide mechanisms for efficient data transfer in a data processing system having a hierarchy of caching domains.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

The present disclosure relates to efficient data transfer between caching domains of a data processing system. The data processing system may be implemented on a single electronic chip or on multiple chips. An embodiment of the data processing system includes multiple caching domains, with each caching domain including one or more caching agents such as processors with level 1 (L1) and level 2 (L2) caches, system level caches and local coherency caches. A first caching domain may include a requesting node that generates read requests for data associated with data addresses of the first caching domain or a second caching domain, a transfer agent that operatively couples between the first and second caching domains and a home agent. A home agent includes a home node that is a final point-of-serialization (PoS) and point-of-coherence (PoC) for an address range that maps to a local memory subsystem. A home agent also includes a local coherency node (LCN) that provides an intermediate or local PoS/PoC for the address ranges that map to remote memory subsystems associated with other caching domains. Accesses from local requesting agents that target the remote address range go through this local PoS/PoC (LCN) to resolve the local coherency. In accordance with embodiments of the disclosure, completion data associated with these accesses is routed to the requesting node, bypassing the LCN. This provides improved efficiency, since routing the completion data through the LCN would result in additional latency and inefficient use of local resources.

The home agent acts as a local coherency node (LCN) that provides a point-of-coherence (PoC) for data addresses of the second caching domain. The LCN receives the first read request from the requesting node and sends a second read request to a transfer agent. The second read request includes an identifier of the requesting node. In response to receiving the second read request, the transfer agent stores the identifier of the requesting node and sends a third read request to the second caching domain. In accordance with an embodiment of the disclosure, when the transfer agent receives the cache line associated with the data address from the second caching domain it sends the cache line to the requesting node, bypassing the home agent of the first caching domain. This avoids the additional latency and inefficient use of local resources that would occur if the cache line was transferred through the LCN.

Figure 1A:
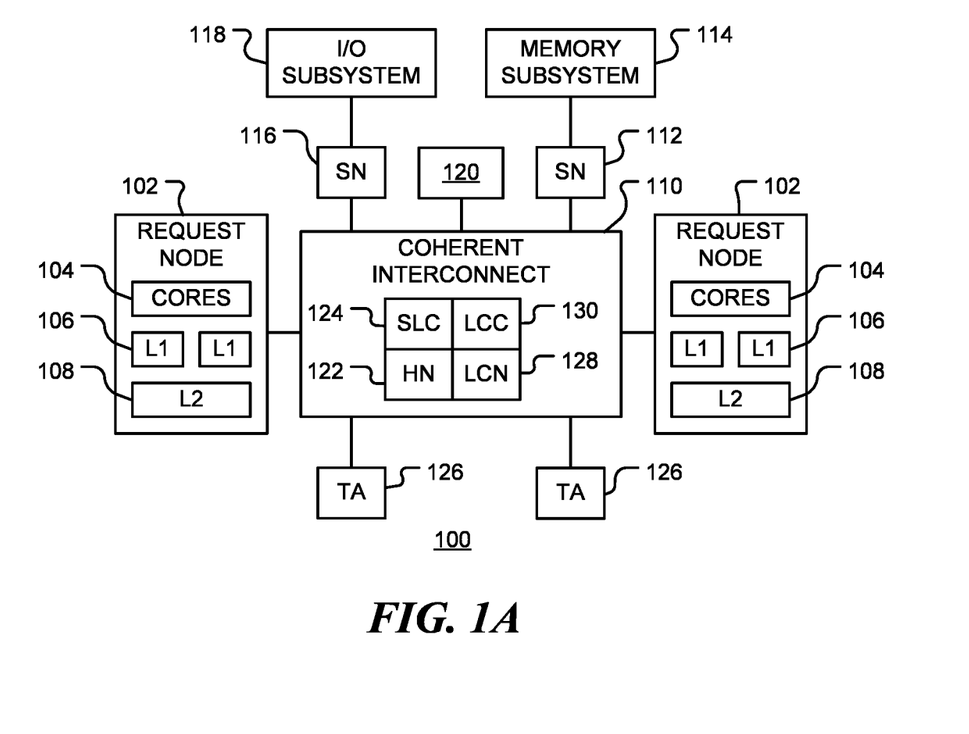
FIG. 1A is a block diagram of a caching domain of a data processing system, in accordance with various representative embodiments.

FIG. 1A is a simplified block diagram of a caching domain 100 of a data processing system, in accordance with various representative embodiments. The data processing system may include multiple caching domains implemented on one or more integrated circuits. In FIG. 1A, caching domain 100 includes a number of requesting nodes 102. Each requesting node may include one or more processing cores 104 together with level one (L1) caches 106 and level two (L2) caches 108. The requesting nodes 102 are coupled to one another via coherent interconnect 110. They are also coupled via coherent interconnect 110 and subordinate node 112 to shared memory subsystem 114. In addition, the requesting nodes may be coupled, via subordinate node 116, to one or more input/output (I/O) subsystems 118 and to one or more other devices 120, such as a hardware accelerator. Example hardware accelerators include array processors, graphics processors, neural processors and the like. In general, caching domain 100 may contain any number of requesting nodes and memory subsystems.

Home node 122 acts as a point of coherence for addresses mapped to memory subsystem 114, while system level cache (SLC) 124 may be a level 3 cache for data mapped to memory subsystem 114.

In accordance with the present disclosure, transfer agents 126 are provided to enable communication with other caching domains. The other caching domains are referred to as being "remote" to caching domain 100. A remote caching domain may be located on the same chip as caching domain 100, or on another chip. The transfer agents enable local requesting nodes 102 to access data (remote data) associated with remote caching domains and may allow remote caching agents to access data mapped to memory subsystem 114. Local coherency node (LCN) 128 acts as a point of coherency for remote data stored in local caches (such as caches 106 and 108). Local coherent cache 130 provides local storage for data associated with remote memory subsystems. The HN, SLC, LCN and LCC may be implemented as one or more nodes in a network of nodes or distributed in multiple slices across the network for increased scalability and parallelism. The HN, SLC, LCN and LCC may share resources.

The caching domains may be arranged in a hierarchy, with each caching domain being represented as a single caching agent in a domain to which it directly connected.

Together, coherent interconnect 110, home node 122, SLC 124, LCN 126 and LCC 128 form a "home agent" for caching domain 100. The home agent tracks data mapped to both local and remote memory subsystems that are stored in caches in caching domain 100 and also tracks data mapped to local memory subsystem 114 that are stored in connected caching domains.

Figure 1B:
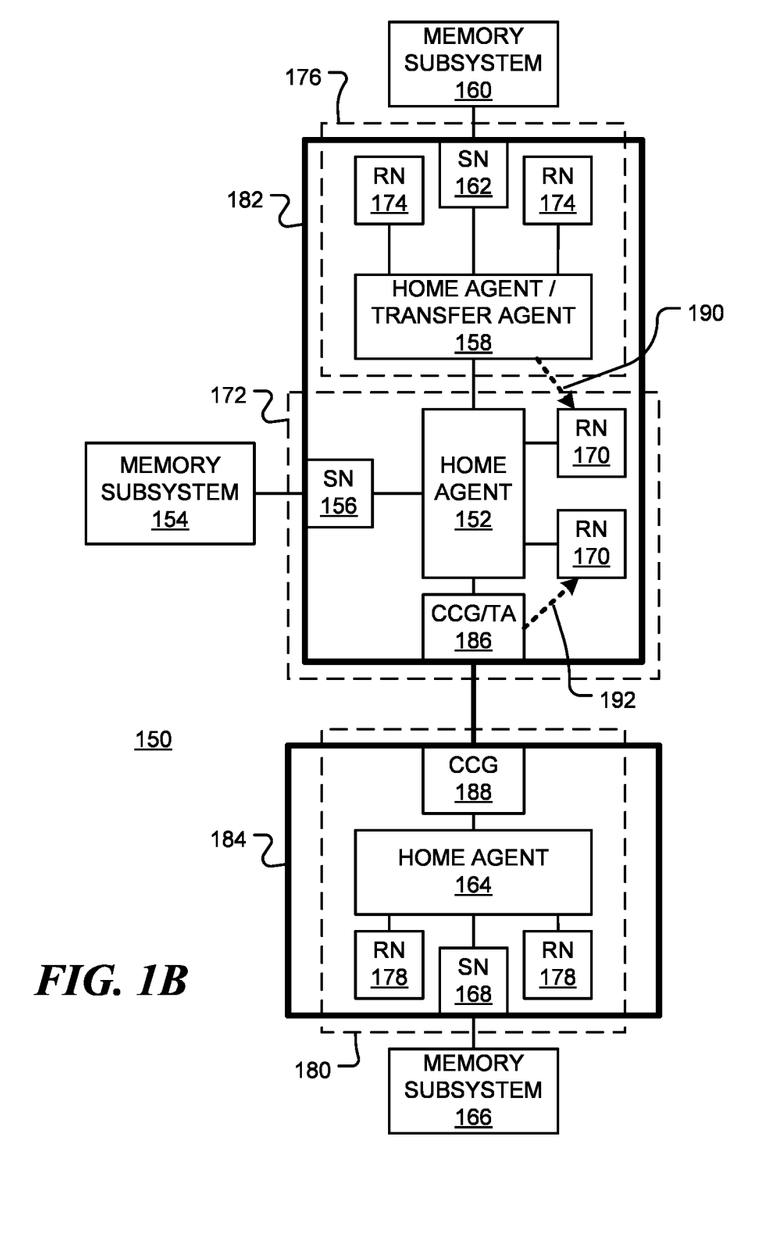
FIG. 1B is a block diagram of a data processing system, in accordance with various representative embodiments.

FIG. 1B is a simplified block diagram of a data processing system 150, in accordance with various embodiments of the present disclosure. In FIG. 1B, home agent (HA) 152 is configured to service transactions associated with data mapped to addresses in memory subsystem 154, which is accessed via subordinate node (SN) or Memory Management Unit (MMU) 156. In addition, HA 152 includes a local coherency node (LCN) that services requests from local requesting nodes for data mapped to remote memory subsystems and tracks remote data stored at local caching agents. Home agent (HA) 158 includes a home node configured to service transactions associated with data mapped to addresses in memory subsystem 160, which is accessed via subordinate node (SN) or Memory Management Unit (MMU) 162. HA 158 tracks local data stored at local or remote caching agents. Home agent 164 is configured to service transactions associated with data mapped to addresses in memory subsystem 166, which is accessed via subordinate node (SN) 168. Each home agent (152, 158 and 164) acts as a point-of-serialization (PoS) for transaction requests and as a point-of-coherency (PoC) for data mapped to a range of addresses in the local memory subsystem.

Transactions may be generated by local or remote requesting nodes. Requesting nodes 170 are, operationally, in caching domain 172 of home agent 152, and are considered to be local to home agent 152. Requesting nodes 174 are, operationally, in caching domain 176 of home agent 158 and are considered to be remote to home agent 152. Requesting nodes 178 are, operationally, in caching domain 180 of home agent 164 and are considered to be remote to home agent 152.

Home agent 152 acts as a home node (HN) for requests for data mapped to addresses in local memory 154, and as a local coherency node (LCN) for requests for data mapped to addresses in remote memory 160 and remote memory 166. The home agents are arranged in a hierarchy. In a home agent, each remote caching domain is treated as a single caching agent, while each local requesting node is treated as a unique caching agent.

Referring again to FIG. 1B, when a requesting node 170 generates a read request for data associated with a data address mapped to memory 154 in local caching domain 172, the request is routed to home agent 152 acting as a home node.

When a requesting node 170 generates a read request for data associated with a data address mapped to memory 160 in remote caching domain 176, the request is routed to home agent 152 acting as a local coherency node (LCN). The request is then passed to home agent 158, which is configured as a transfer agent (TA) for remote caching domain 176.

When a requesting node 170 generates a read request for data associated with a data address mapped to memory 166 in remote caching domain 180, the request is routed to home agent 152 acting as a local coherency node (LCN). The request is then passed to chip-to-chip gateway (CCG) 186 that is configured to operatively couple between first IC 182 and second IC 184. CCG 186 is a transfer agent (TA) for requests to caching domain 180. The request is received at corresponding CCG 188 of second IC 184 and passed to home agent 164. Home agent 152 includes an LCN configured to act as a local point of coherence for data addresses of the second IC and remote caching domain 176 on first IC 182. The LCN receives the read request from the requesting node and sends a corresponding read request to second IC 184 via chip-to-chip gateway 186.

Caching domain 172 uses home agent 158 as a transfer agent for caching domain 176 on first IC 182 and uses CCG 186 as a transfer agent for caching domain 180 on second IC 184. A data processing system may have one or more chips and each chip may have one or more caching domains. In general, a first read request is sent from a requesting node of a first caching domain to an LCN of the first caching domain. A second read request, including an identifier of the requesting node, is then sent from the LCN to the transfer agent coupled to a second caching domain. The read request is tracked in the transfer agent, so the identifier of the requesting node does not need to be sent to the second caching domain when it is on another chip. The transfer agent receives a cache line associated with the data address from the second caching domain and sends the cache line to the requesting node. For example, home agent/transfer agent 158 passes a received cache line to a requesting node 170, as depicted by broken arrow 190. The LCN of the home node is bypassed. CCG/transfer agent 186 passes a received cache line to a requesting node 170, as depicted by broken arrow 192. The data may be passed via a coherent interconnect, for example. The LCN of the home agent receives a read-receipt response from the transfer agent and, in response, updates a coherency state for the cache line.

The transfer agent blocks snoop messages from the second caching domain until the completion acknowledgement message is received from the local coherency node. The requesting node sends the read request for data associated with the data address of the second caching domain to the local coherency node, stores the cache line received from the transfer agent in a cache, and sends the completion acknowledgement message to the local coherency node. The local coherency node stores the cache line in a local coherency cache of the local coherency node, enabling the stored cache line to be sent to the requesting node in response to receiving a subsequent read request for data in the cache line.

The transfer agent may send a read-receipt response to the local coherency node in response to receiving the cache line associated with the data address from the second caching domain, while the local coherency node may send a completion acknowledgement message to the transfer agent in response to receiving the read-receipt response from the transfer agent.

In one embodiment, the transfer agent is configured to send the cache line to the requesting node via the local coherency node (LCN) when message congestion is detected in a response channel of the first caching domain.

In another embodiment, the coherency state for the cache line is restricted to be one of Modified (M), Exclusive (E), and Invalid (I). In this embodiment, the local coherency node sends a completion acknowledgement message to the transfer agent in response to receiving the completion acknowledgement message from the requesting node.

In one embodiment, the functions of the HN, SLC, LCN and LCC are combined as a Super Home Node (HN-S). A Super Home Node acts as home node for local memory and as a cluster cache for data associated with remote caching domains. All coherent cache lines targeting remote cache lines go through the Super Home Node for local coherency resolution, hence the Super Home Node has a dual capability where it is a local coherency node (LCN) for remote lines and a fully coherent home node for local memory. The LCN acts as a single caching agent for a first caching domain and presents itself as a Requesting Node (RN) to the home node of a second caching domain.

Communication between nodes of the data processing network uses request, response and data channels. The present disclosure provides mechanisms for reducing backpressure or congestion on the response channel and reducing data on the interconnect. In addition, the latency of completion data is reduced.

A method of the disclosure includes a local coherency node (LCN) of a first caching domain receiving a first read request, from a requesting node of the first caching domain, for data associated with a data address of a second caching domain. The LCN sends a second read request to a transfer agent for the second caching domain. The second read request includes an identifier of the requesting node. The transfer agent sends a third read request to a completer for the second caching domain. In response to receiving a cache line associated with the data address from the completer in the second caching domain, the transfer agent sends the cache line to the requesting node. The LCN updates a coherency state for the cache line in response to receiving a read-receipt response from the transfer agent or a completion acknowledgement message from the requesting node.

The transfer agent blocks snoop messages from the second caching domain until the completion acknowledgement message is received from the local coherency node.

The requesting node sends the read request for data associated with the data address of the second caching domain to the LCN, stores the cache line received from the transfer agent in a cache, and sends the completion acknowledgement message to the local coherency node.

The LCN may store the cache line in a local coherency cache and sends the stored cache line to a requesting node of the first caching domain in response to receiving a subsequent read request for data in the cache line.

In response to receiving the cache line associated with the data address from the second caching domain, the transfer agent may send a read-receipt response to the local coherency node. The read-receipt may describe the coherency state of the cache line. The LCN tracks the coherency state and acknowledges receiving the read-receipt response from the transfer agent by sending a completion acknowledgement message to the transfer agent.

In a further embodiment, the transfer agent detects message congestion in a response channel of the first caching domain and, when message congestion is detected in the response channel, sends the cache line to the requesting node via the LCN. When no congestion is detected, the cache line is sent directly to the requesting node.

In a still further embodiment, where the coherency state for the cache line is one of Modified (M), Exclusive (E), and Invalid (I), the method includes sending, by the local coherency node in response to receiving the completion acknowledgement message from the requesting node, a completion acknowledgement message to the transfer agent.

Figure 2:
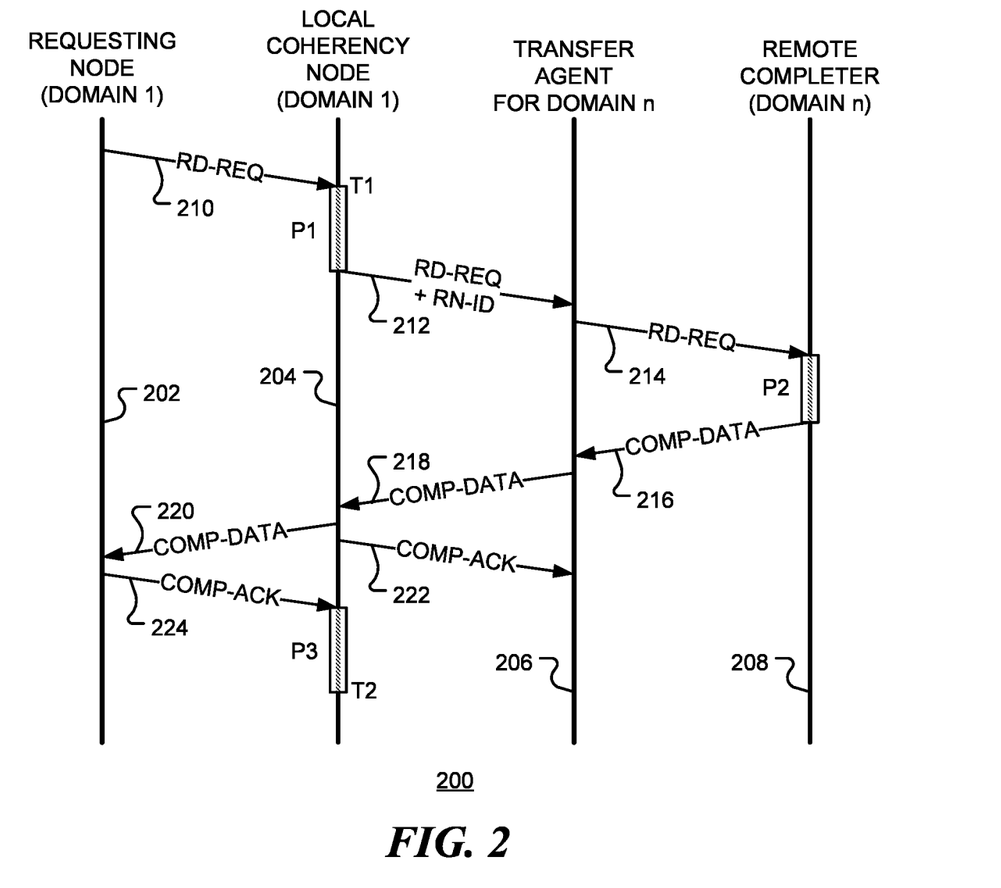
FIG. 2 is a dataflow graph showing an example read transaction in a data processing system, in accordance with various representative embodiments.

FIG. 2 is a dataflow graph 200 showing an example read transaction. Dataflow chart 200 shows timeline 202 for a requesting node of a first caching domain, timeline 204 of a LCN (or a distributed slice thereof) of the first caching domain, timeline 206 for a transfer agent used by the first caching domain to access a second caching domain (domain n) and timeline 208 for a remote completer in the second caching domain. Time flows from top to bottom of the timelines.

Read request 210 for data associated with a data address of the first caching domain is sent by the requesting node to the local coherency node (LCN) of the first caching domain for coherency resolution. First read request 210 is received by the LCN at time T1. In time period P1, the LCN allocates a tracker entry for the requested transaction and determines if a cache line containing the requested data is stored in the local coherency cache. If no cache line is found, the LCN sends a second read request 212 to a transfer agent (TA) of for the second caching domain. The second read request may include an identifier of the requesting node. In turn, the transfer agent sends a third read request 214 to the completer in the second caching domain. In time period P2, the requested data is retrieved from a completer of the second caching domain, and any required local coherency actions are performed. The requested data is passed back to the transfer agent in completion-data (COMP-DATA) message 216. The data is then forwarded to the LCN of the first caching domain in COMP-DATA message 218. The LCN forwards the data to the requesting node in COMP-DATA message 220 and sends completion-acknowledge (COMP-ACK) message 222 to the transfer agent to indicate receipt of the data. Upon receiving the requested data, the requesting node sends COMP-ACK message 224 back to the LCN and the LCN, in time period P3, updates a coherency state and presence vector for the cache line in its snoop filter. At time T2, the read transaction is complete and any utilized resources of the LCN can be released.

In the example dataflow shown in FIG. 2, the completion data response is sent to the LCN to enable its snoop filter (SF) to be updated, and also provided to the requesting CPU. This adds an additional hop for the data response which results in added latency and occupies data bandwidth over the interconnect.

In accordance with an embodiment of the disclosure a direct data transfer mechanism is used in which the completion data response can be directly forwarded from the transfer agent to the requesting node and only state of the line is forwarded to the LCN or LCN slice. This significantly reduces the latency in the data response and reduces traffic in the interconnect.

Figure 3:
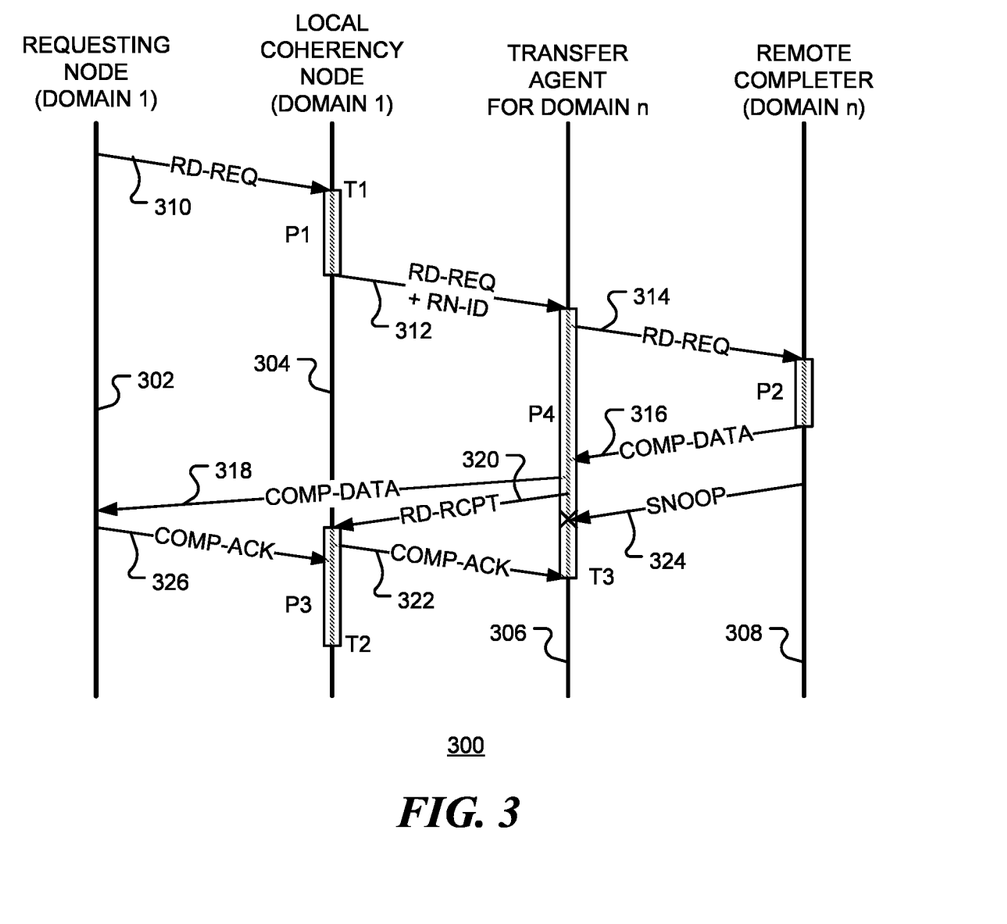
FIG. 3 is a dataflow graph showing an example read transaction, in accordance with various representative embodiments.

FIG. 3 is a dataflow graph 300 showing an example read transaction, in accordance with various embodiments of the disclosure. Dataflow chart 300 shows timeline 302 for a requesting node of a first caching domain, timeline 304 of a LCN (or a distributed slice thereof) of the first caching domain, timeline 306 for a transfer agent used by the first caching domain to access a second caching domain (domain n) and timeline 308 for a completer of the second caching domain. Time flows from top to bottom of the timelines. First read request 310 for data associated with a data address of the first caching domain is sent by the requesting node to the local coherency node (LCN) of the first caching domain for coherency resolution. First read request 310 is received by the LCN at time T1 for data associated with a second caching domain. In time period P1, the LCN allocates a tracker entry for the requested transaction and determines if a cache line containing the requested data is stored in the local coherency cache. If no cache line is found, the LCN sends a second read request 312 to a transfer agent (TA) associated with the second caching domain to request that the transfer agent performs a Direct Data Transfer for the completion data. In turn, the transfer agent sends a third read request 314 to the second caching domain. This request may be sent via a chip-to-chip link or sent to the home agent of a second caching domain on the same chip as the first domain. In time period P2, the requested data is retrieved by a completer of the second caching domain, and the home agent of the second caching domain performs any required local coherency actions. On receiving data response 316, the transfer agent forwards this directly to the requesting node in message 318 and synthesizes a data-less read-receipt response 320 that is sent to the LCN. The transfer agent sends the coherence state information in response 320 to the LCN and may also send the LCN's information to the requesting node.

After receiving the response, the LCN sends a completion-acknowledgement response 322 to the transfer agent. During the time period P4 of the transaction, the transfer agent blocks any incoming snoops from the remote caching domain, as indicated by snoop request 324. Time period T4 ends when the transfer agent receives completion-acknowledgement response 322 from the LCN at time T3. When the LCN receives completion acknowledgement response 326 from the requesting node, it updates the state of the line in its snoop filter during time period P2. This completes the transaction for the LCN at time T2. In this manner, the data response 318 passes directly from the transfer agent to the requesting node in a single hop, reducing data traffic in the interconnect and reducing latency in the data transfer.

In a similar manner, this dataflow may be extended to handle other requests. For example, "Persist" and "Tag-Match" responses may be sent directly to the requesting node, bypassing LCN. This helps to reduce the lifetime of LCN's Point-of-Coherence Queue (POCQ) for some persistent memory requests.

The above direct data transfer mechanism adds an additional response on the response channel. In the presence of response channel congestion, this additional response may negatively impact the latency and available data bandwidth. In a further embodiment, the transfer agent determines when to do direct data transfer to the requesting node and when to disable it. In this embodiment, the read request (312) sent to the transfer agent (TA) for the second caching domain includes a speculative request that the transfer agent performs a Direct Data Transfer for the completion data. The transfer agent, on receiving completion (COMP-DATA) message 316, checks for response channel backpressure. When the response channel is not congested, it forwards the data directly to the requesting node and synthesizes a data-less response that is sent to LCN. transfer agent sends the state information on response sent to LCN and sends the LCN's information to the requesting node. However, when the response channel is back pressured, the data response is sent to the LCN, as shown in FIG. 2. The transfer agent can implement various heuristics to detect response channel backpressure. For example, if a stall occurs when uploading a response from the transfer agent to the mesh stalls, a counter is incremented. The counter is decremented when there is no stall. When the counter reaches a threshold the direct data transfer is disabled.

The LCN, after receiving the response with or without data, sends a completion-acknowledgement response to the transfer agent. If the data response is received by the LCN, it is forwarded to the requesting node. The transfer agent blocks any incoming snoops from the second caching domain until it receives a completion-acknowledgement response from the LCN. In turn, the LCN waits for completion-acknowledgement response to update the state of the line in its snoop filter.

The read-receipt response (320 in FIG. 3) from the transfer agent to the LCN can be avoided when the LCN supports only Modified, Exclusive, Invalid (MEI) states for the remote lines (all or selective). This embodiment is illustrated in FIG. 4.

Figure 4:
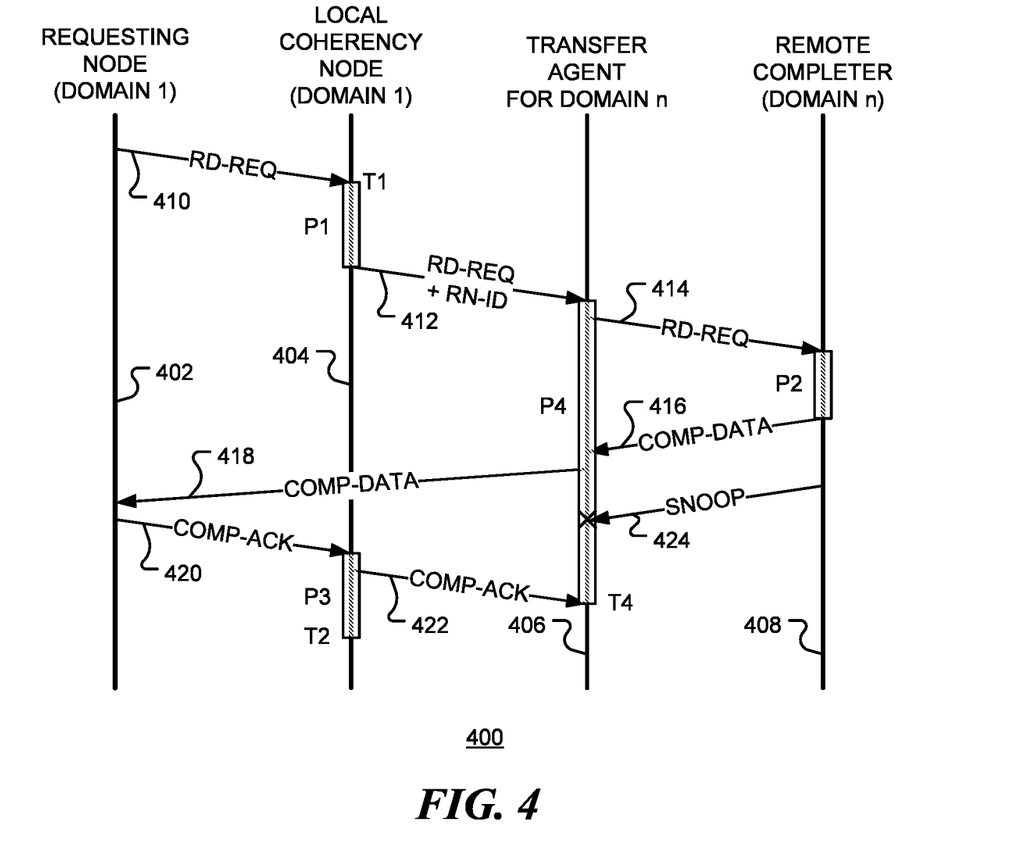
FIG. 4 is a further dataflow graph showing an example read transaction, in accordance with various representative embodiments.

FIG. 4 is a dataflow graph 400, in accordance with various example embodiments. Dataflow chart 400 shows timeline 402 for a requesting node of a first caching domain, timeline 404 of a LCN (or a distributed slice thereof) of the first caching domain, timeline 406 for a transfer agent used by the first caching domain to access a second caching domain (domain n) and timeline 408 for a completer of the second caching domain. Time flows from top to bottom of the timelines. First read request 410 for data associated with a data address of the second caching domain is sent by the requesting node to the local coherency node (LCN) of the first caching domain for coherency resolution. First read request 410 is received by the LCN at time T1. In time period P1, the LCN allocates a tracker entry for the requested transaction and determines if a cache line containing the requested data is stored in the local coherency cache. If a cache line containing the requested data is found, the LCN returns a COMP-DATA message containing the cache line. If no cache line is found, the LCN sends a second read request 412 to a transfer agent (TA) for the second caching domain. The second read request may include an identifier of the requesting node and requests that the transfer agent perform a Direct Data Transfer for the completion data. In turn, the transfer agent sends third read request 414 to a completer of the second caching domain. The third read request may be sent to the completer via a home agent of the second caching domain. In time period P2, the completer of the second caching domain retrieves the requested data and the remote home agent performs any required local coherency actions. On receiving data response 416, the transfer agent forwards the data directly to the requesting node in message 418. However, in this embodiment, no read-receipt response is sent to the LCN.

After receiving the response data, the requesting node sends a completion-acknowledgement response 420 to the LCN. When the LCN receives completion acknowledgement response 420 from the requesting node, it updates the state of the line in its snoop filter during time period P2. The LCN also sends a completion-acknowledgement response 422 to the transfer agent. During the time period P4 of the transaction, the transfer agent blocks any incoming snoops from the remote caching domain, as indicated by snoop request 424. Time period T4 ends when the transfer agent receives completion-acknowledgement response 422 from the LCN at time T3. This completes the transaction. In this manner, the number of response messages is reduced, reducing traffic on the response channel of the interconnect.

Figure 5:
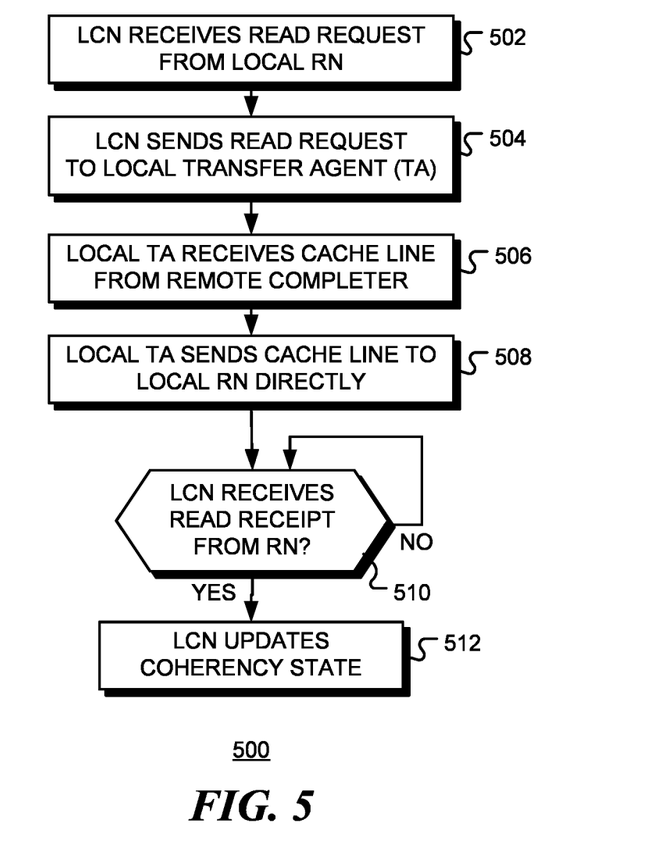
FIG. 5 is a flow chart of a method of data transfer in a data processing system, in accordance with various representative embodiments.

FIG. 5 is a flow chart 500 of a method of data transfer in a data processing system, in accordance with various representative embodiments. At block 502 a local coherency node (LCN) of a first caching domain receives a read request, from a requesting node (RN) of the first caching domain, for data associated with a data address of a second caching domain. At block 504, the local coherency node sends a corresponding read request to the second caching domain via a transfer agent for the second caching domain. The corresponding read request includes an identifier of the requesting node. At block 506, the transfer agent receives a cache line associated with the data address from the second caching domain and, at block 508, the transfer agent sends the cache line to the requesting node (RN). When the LCN receives the read-receipt response from the requesting node, as depicted by the positive branch from decision block 510, the local coherency node updates a coherency state for the cache line in its snoop filter at block 512. Otherwise, as depicted by the negative branch from decision block 510, the LCN waits for the read-receipt response.

Figure 6:
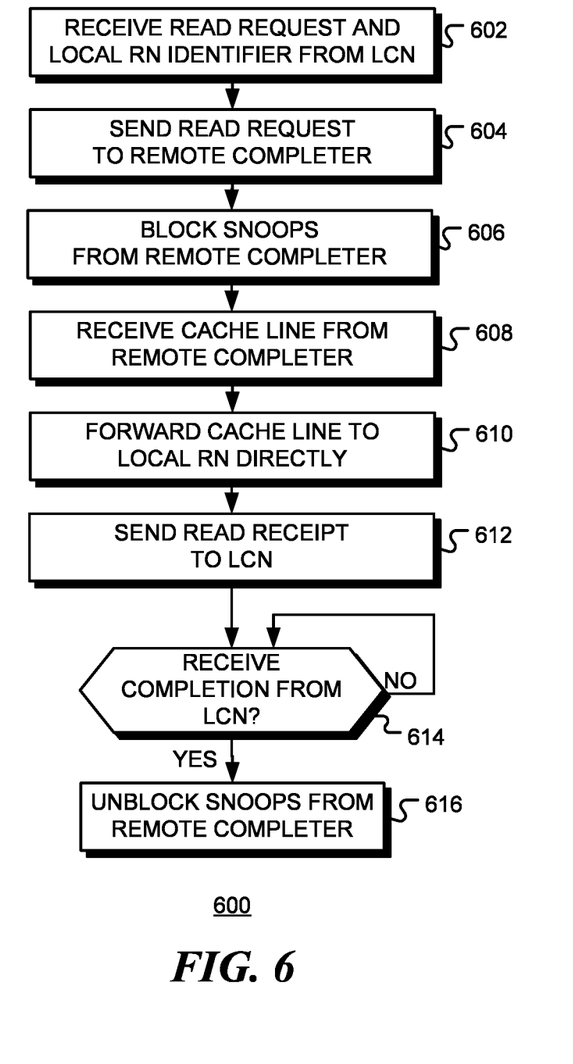
FIG. 6 is a further flow chart of a method of data transfer in a data processing system, in accordance with various representative embodiments.

FIG. 6 is a flow chart 600 of a method of data transfer in a data processing system. At block 602, a transfer agent receives a read request for data associated with a remote caching domain from the LCN of a first caching domain. At block 604 the request is forwarded to the transfer agent for a second caching domain and the transfer agent begins blocking snoop requests from the second caching domain at block 606. The transfer agent receives a cache line containing the requested data from the second caching domain at block 608 and forwards it directly to the requesting node at block 610. A read-receipt is sent to the LCN. When a completion-acknowledgement response is received from the LCN, as depicted by the positive branch from decision block 614, the transfer agent stops blocking snoop requests from the second caching domain at block 616. Otherwise, as depicted by the negative branch from decision block 614, the transfer agent waits for the completion-acknowledgement response.

Figure 7:
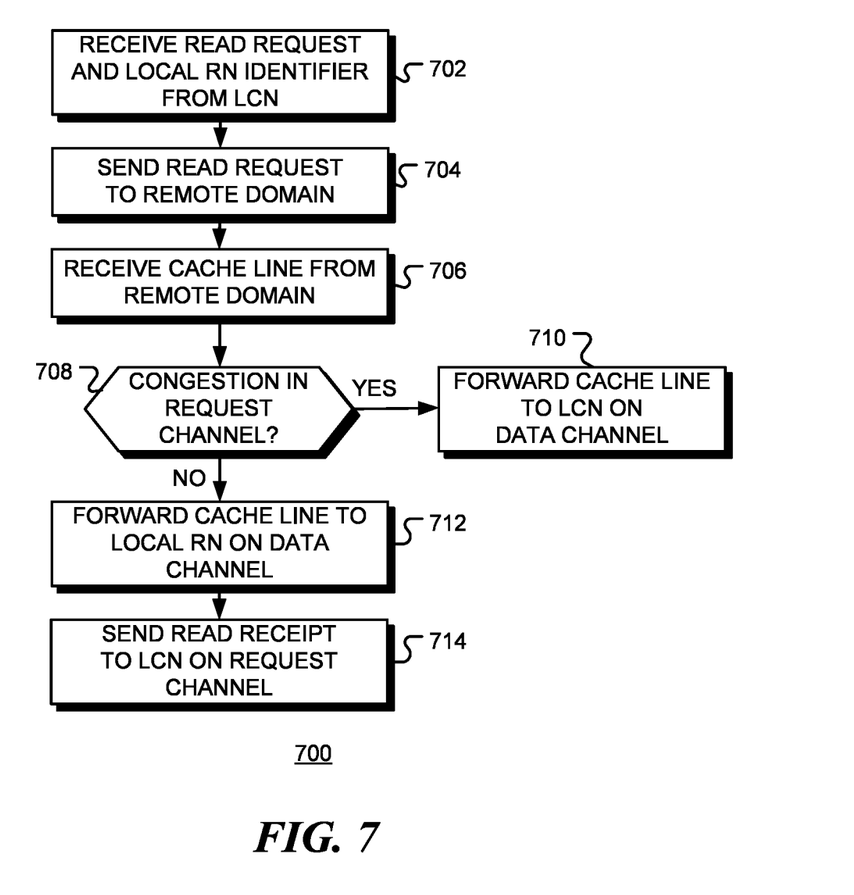
FIG. 7 is a further flow chart of a method of data transfer in a data processing system, in accordance with various representative embodiments.

FIG. 7 is a flow chart 700 of a further method of data transfer in a data processing system. At block 702, a transfer agent receives a read request from a LCN of a first caching domain for data associated with a second caching domain. A corresponding read request is sent from the transfer agent to the second caching domain at block 704. At block 706, the transfer agent receives a cache line containing the requested data from the second caching domain. At decision block 708, the transfer agent detects message congestion in a response channel of the first caching domain. When message congestion is detected in the response channel, as depicted by the positive branch from decision block 708, the transfer agent sends the cache line to the requesting node via the LCN at block 710. When no message congestion is detected in the response channel, as depicted by the negative branch from decision block 708, the transfer agent sends the cache line directly to the requesting node at block 712 and sends a read-receipt to the LCN at block 716.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

The embodiments described herein are combinable.

In one embodiment, a method comprising receiving, by a local coherency node (LCN) of a home agent of a first caching domain from a requesting node of the first caching domain, a first read request for data mapped to a data address of a second caching domain; sending, by the LCN, a second read request to the second caching domain via a transfer agent, the second read request including an identifier of the requesting node; storing, by the transfer agent, the identifier of the requesting node; sending, by the transfer agent, a third read request to a completer of the second caching domain; in response to receiving a cache line associated with the data address from the completer of the second caching domain, the transfer agent sending the cache line to the requesting node, bypassing the LCN.

In one embodiment, the method further comprising sending, by the transfer agent, a read-receipt response indicating a coherency state of the cache line to the LCN, the read-receipt response specifying a coherency state of the cache line; sending, by the requesting node, a completion acknowledgement message to the LCN; and on receiving read receipt from transfer agent and completion acknowledgement from requesting node, the LCN updating a coherency state of the cache line.

In another embodiment, the method further comprising blocking, by the transfer agent, snoop messages from the second caching domain until a completion acknowledgement message is received from the LCN.

In one embodiment, the method further comprising the requesting node sending the first read request for data associated with the data address of the second caching domain to the LCN; storing the cache line received from the transfer agent in a cache of the first caching domain; and sending a completion acknowledgement message to the LCN.

In one embodiment, the method further comprising storing the cache line in a local coherency cache of the home agent.

In another embodiment, the method further comprising the home agent storing the cache line in a local coherency cache of the home agent; and after storing the cache line in the local coherency cache, sending the stored cache line to a requesting node of the first caching domain in response to receiving a read request for data in the cache line.

In one embodiment, the method further comprising in response to receiving the cache line associated with the data address from the completer of the second caching domain, the transfer agent sending a read-receipt response to the LCN; and sending, by the LCN in response to receiving the read-receipt response from the transfer agent, a completion acknowledgement message to the transfer agent.

In one embodiment, the method further comprising detecting message congestion in a response channel of the first caching domain; and when message congestion is detected in the response channel, the transfer agent sending the cache line to the requesting node via the LCN.

In another embodiment, the method where the coherency state for the cache line is one of Modified (M), Exclusive (E), and Invalid (I), the method further comprising sending, by the LCN in response to receiving the completion acknowledgement message from the requesting node, a completion acknowledgement message to the transfer agent.

In one embodiment, an apparatus comprising a first caching domain including a requesting node configured to generate a first read request for data associated with a data address of a second caching domain; a plurality of caching agents; a transfer agent configured to operatively couple between the first and second caching domains; and a home agent including a local coherency node (LCN) configured to act as a point of coherence for the cache lines mapped to memory associated with the second caching domain; receive the first read request from the requesting node, and send a second read request to the transfer agent, the second read request including an identifier of the requesting node, where the transfer agent is further configured to responsive to receiving the second read request, store the identifier of the requesting node and send a third read request to a completer of the second caching domain, receive a cache line associated with the data address from the completer of the second caching domain, and send the cache line to the requesting node, bypassing the LCN.

In one embodiment, the apparatus where the transfer agent is further configured to block snoop messages from the second caching domain to the first caching domain until a completion acknowledgement message is received from the LCN.

In another embodiment, the apparatus where the requesting node is further configured to send the first read request for data associated with the data address of the second caching domain to the LCN; store the cache line received from the transfer agent in a cache; and send a completion acknowledgement message to the LCN.

In one embodiment, the apparatus where the home agent also includes a local coherency cache, where the home agent is further configured to store the cache line in the local coherency cache.

In one embodiment, the apparatus where the LCN is further configured to send the stored cache line to a requesting node of the first caching domain in response to receiving a subsequent read request for data in the cache line.

In another embodiment, the apparatus where the transfer agent is further configured to send a read-receipt response to the LCN in response to receiving the cache line associated with the data address, and the coherency state thereof, and where the LCN is further configured to send a completion acknowledgement message to the transfer agent in response to receiving the read-receipt response from the transfer agent.

In one embodiment, the apparatus where the transfer agent is further configured to send the cache line to the requesting node via the LCN when message congestion is detected in a response channel of the first caching domain.

In one embodiment, the apparatus where the coherency state for the cache line is one of Modified (M), Exclusive (E), and Invalid (I), and the LCN is further configured to send a completion acknowledgement message to the transfer agent in response to receiving the completion acknowledgement message from the requesting node.

In another embodiment, the apparatus where the first caching domain is implemented in a first integrated circuit and the second caching domain is implemented in a second integrated circuit and where the transfer agent includes a chip-to-chip gateway in the first integrated circuit.

In one embodiment, the apparatus where the transfer agent is included in a home agent of the second caching domain.

In one embodiment, a non-transitory computer readable medium containing a netlist or instructions of a hardware description language descriptive of the apparatus.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method comprising:
   receiving, by a local coherency node (LCN) of a home agent of a first caching domain from a requesting node of the first caching domain, a first read request for data mapped to a data address of a second caching domain;
   sending, by the LCN, a second read request to the second caching domain via a transfer agent, the second read request including an identifier of the requesting node;
   storing, by the transfer agent, the identifier of the requesting node;
   sending, by the transfer agent, a third read request to a completer of the second caching domain;
   in response to receiving a cache line associated with the data address from the completer of the second caching domain, the transfer agent sending the cache line to the requesting node, bypassing the LCN.

2. The method of claim 1, further comprising:
   sending, by the transfer agent, a read-receipt response indicating a coherency state of the cache line to the LCN, the read-receipt response specifying a coherency state of the cache line;
   sending, by the requesting node, a completion acknowledgement message to the LCN; and
   on receiving read receipt from transfer agent and completion acknowledgement from requesting node, the LCN updating a coherency state of the cache line.

3. The method of claim 1, where a coherency state for the cache line is one of Modified (M), Exclusive (E), and Invalid (I), the method further comprising:
   sending, by the LCN in response to receiving a completion acknowledgement message from the requesting node, the completion acknowledgement message to the transfer agent.

4. The method of claim 1, further comprising blocking, by the transfer agent, snoop messages from the second caching domain until a completion acknowledgement message is received from the LCN.

5. The method of claim 4, further comprising the requesting node:
   sending the first read request for data associated with the data address of the second caching domain to the LCN;
   storing the cache line received from the transfer agent in a cache of the first caching domain; and
   sending a completion acknowledgement message to the LCN.

6. The method of claim 1, further comprising storing the cache line in a local coherency cache of the home agent.

7. The method of claim 1, further comprising the home agent:
   storing the cache line in a local coherency cache of the home agent; and
   after storing the cache line in the local coherency cache, sending the stored cache line to a requesting node of the first caching domain in response to receiving a read request for data in the cache line.

8. The method of claim 1, further comprising:
   in response to receiving the cache line associated with the data address from the completer of the second caching domain, the transfer agent sending a read-receipt response to the LCN; and
   sending, by the LCN in response to receiving the read-receipt response from the transfer agent, a completion acknowledgement message to the transfer agent.

9. The method of claim 1, further comprising:
   detecting message congestion in a response channel of the first caching domain; and
   when message congestion is detected in the response channel, the transfer agent sending the cache line to the requesting node via the LCN.

10. An apparatus comprising:
    a first caching domain including:
      a requesting node configured to generate a first read request for data associated with a data address of a second caching domain;
      a plurality of caching agents;
      a transfer agent configured to operatively couple between the first and second caching domains; and
      a home agent including a local coherency node (LCN) configured to:
        act as a point of coherence for cache lines mapped to memory associated with the second caching domain;
        receive the first read request from the requesting node, and
        send a second read request to the transfer agent, the second read request including an identifier of the requesting node,
    where the transfer agent is further configured to:
      responsive to receiving the second read request, store the identifier of the requesting node and send a third read request to a completer of the second caching domain,
      receive a cache line associated with the data address from the completer of the second caching domain, and
      send the cache line to the requesting node, bypassing the LCN.

11. The apparatus of claim 10, where the transfer agent is further configured to block snoop messages from the second caching domain to the first caching domain until a completion acknowledgement message is received from the LCN.

12. The apparatus of claim 10, where the requesting node is further configured to:
    send the first read request for data associated with the data address of the second caching domain to the LCN;
    store the cache line received from the transfer agent in a cache; and
    send a completion acknowledgement message to the LCN.

13. The apparatus of claim 10, where the home agent also includes a local coherency cache, where the home agent is further configured to store the cache line in the local coherency cache.

14. The apparatus of claim 13, where the LCN is further configured to send the stored cache line to a requesting node of the first caching domain in response to receiving a subsequent read request for data in the cache line.

15. The apparatus of claim 10, where the transfer agent is further configured to send a read-receipt response to the LCN in response to receiving the cache line associated with the data address, and a coherency state thereof, and where the LCN is further configured to send a completion acknowledgement message to the transfer agent in response to receiving the read-receipt response from the transfer agent.

16. The apparatus of claim 10, where a coherency state for the cache line is one of Modified (M), Exclusive (E), and Invalid (I), and the LCN is further configured to send a completion acknowledgement message to the transfer agent in response to receiving the completion acknowledgement message from the requesting node.

17. The apparatus of claim 10, the transfer agent is further configured to send the cache line to the requesting node via the LCN when message congestion is detected in a response channel of the first caching domain.

18. The apparatus of claim 10, where the first caching domain is implemented in a first integrated circuit and the second caching domain is implemented in a second integrated circuit and where the transfer agent includes a chip-to-chip gateway in the first integrated circuit.

19. The apparatus of claim 10, where the transfer agent is included in a home agent of the second caching domain.

20. A non-transitory computer readable medium containing a netlist or instructions of a hardware description language descriptive of the apparatus of claim 10.

* * * * *